May 29, 1956        C. A. THOMAS        2,747,544
TEAT CUP SUPPORT ASSEMBLY
Original Filed Aug. 18, 1948        4 Sheets-Sheet 1
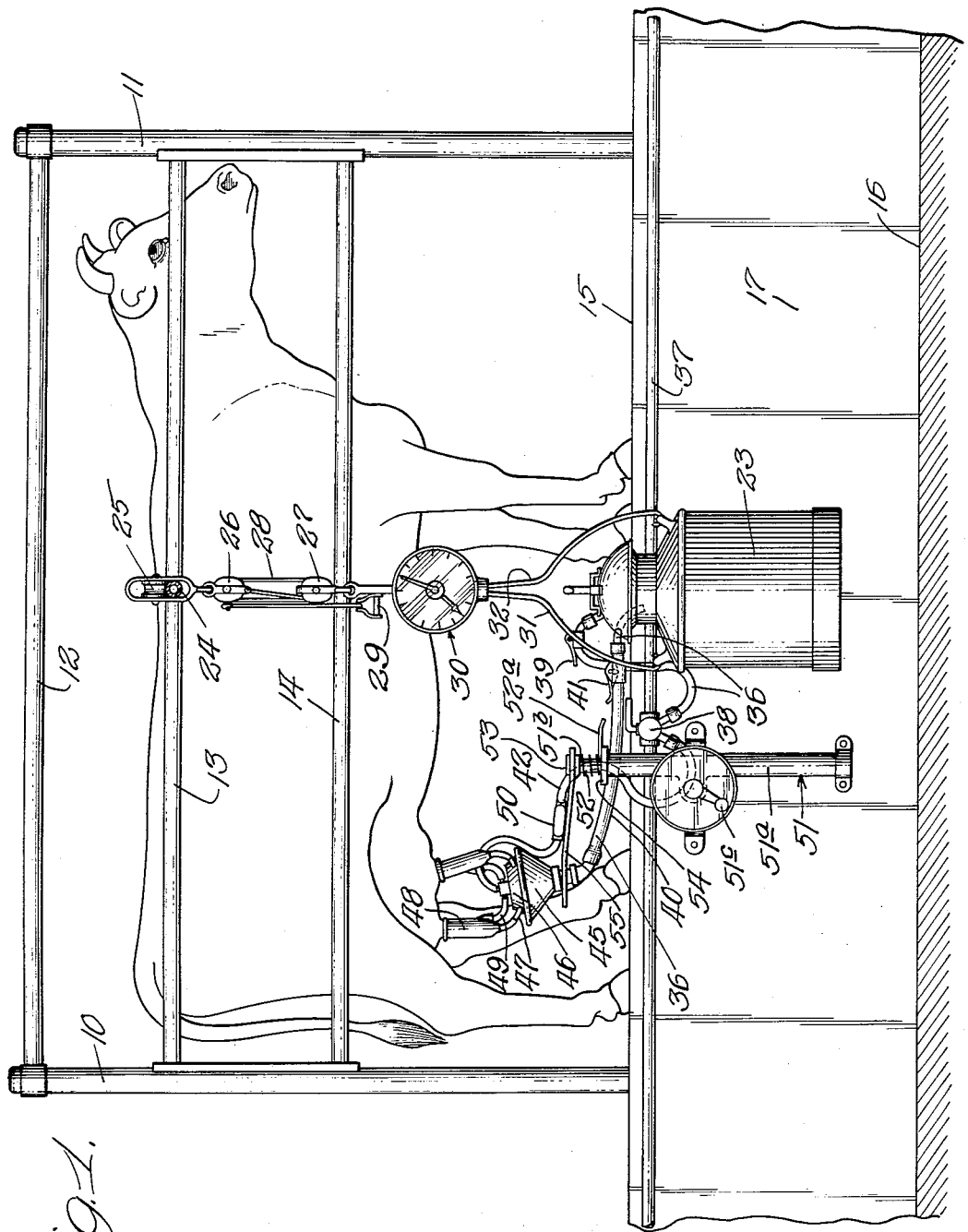
Inventor:
Chester A. Thomas,
By Clinton, Schroeder,
Merriam, Holgren, Attys.

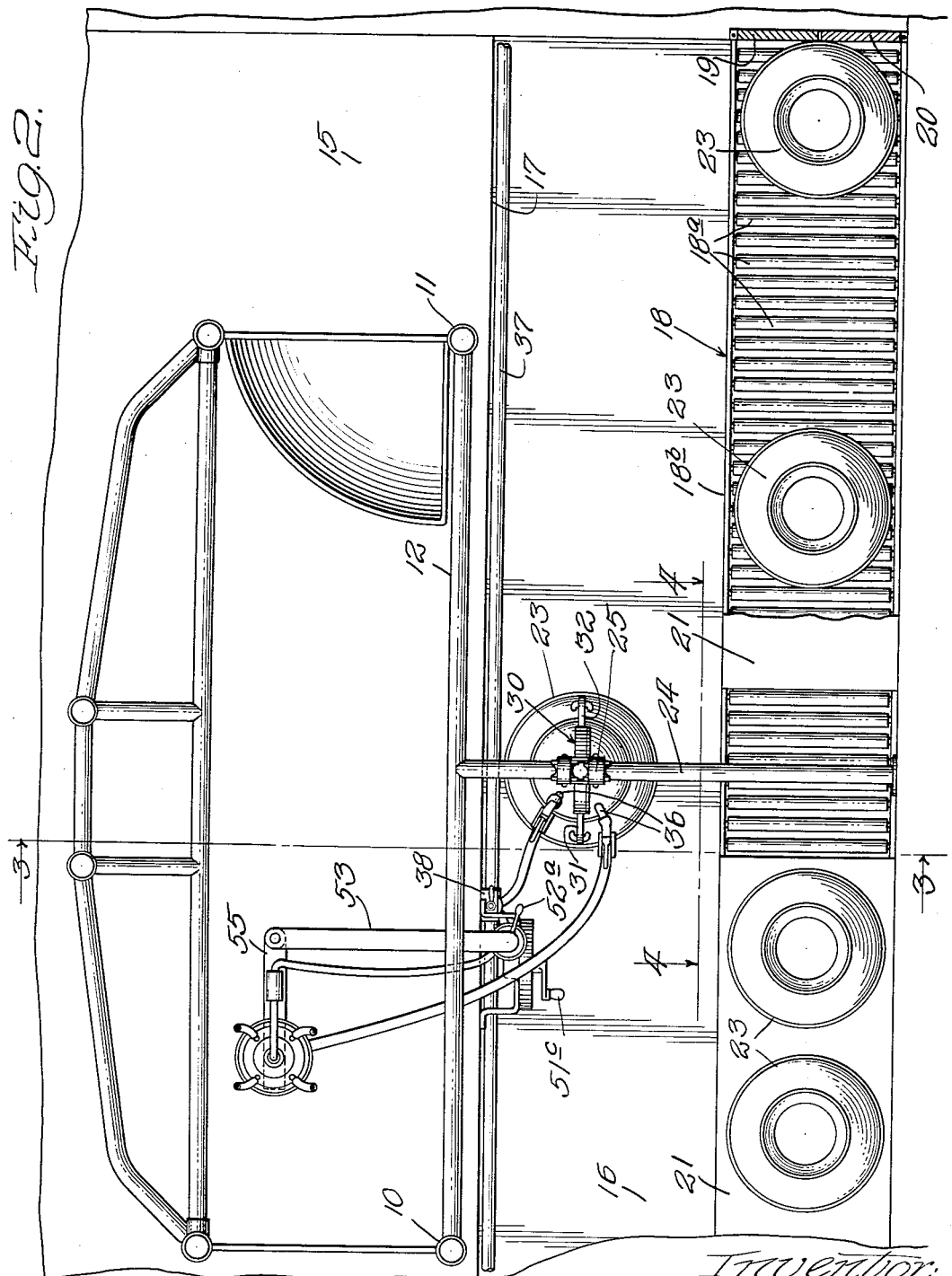

May 29, 1956　　　　C. A. THOMAS　　　　2,747,544
TEAT CUP SUPPORT ASSEMBLY
Original Filed Aug. 18, 1948　　　　4 Sheets-Sheet 3
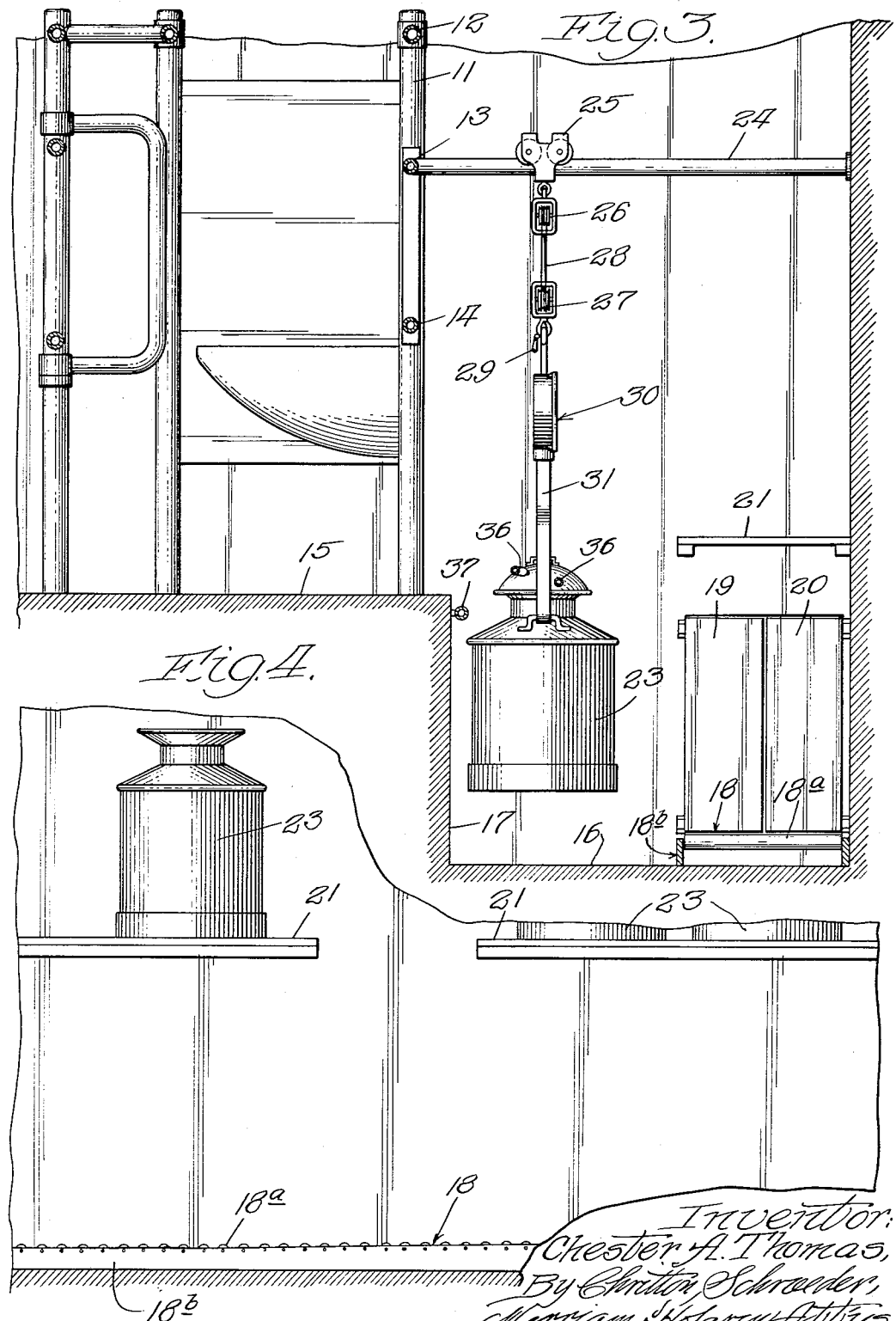

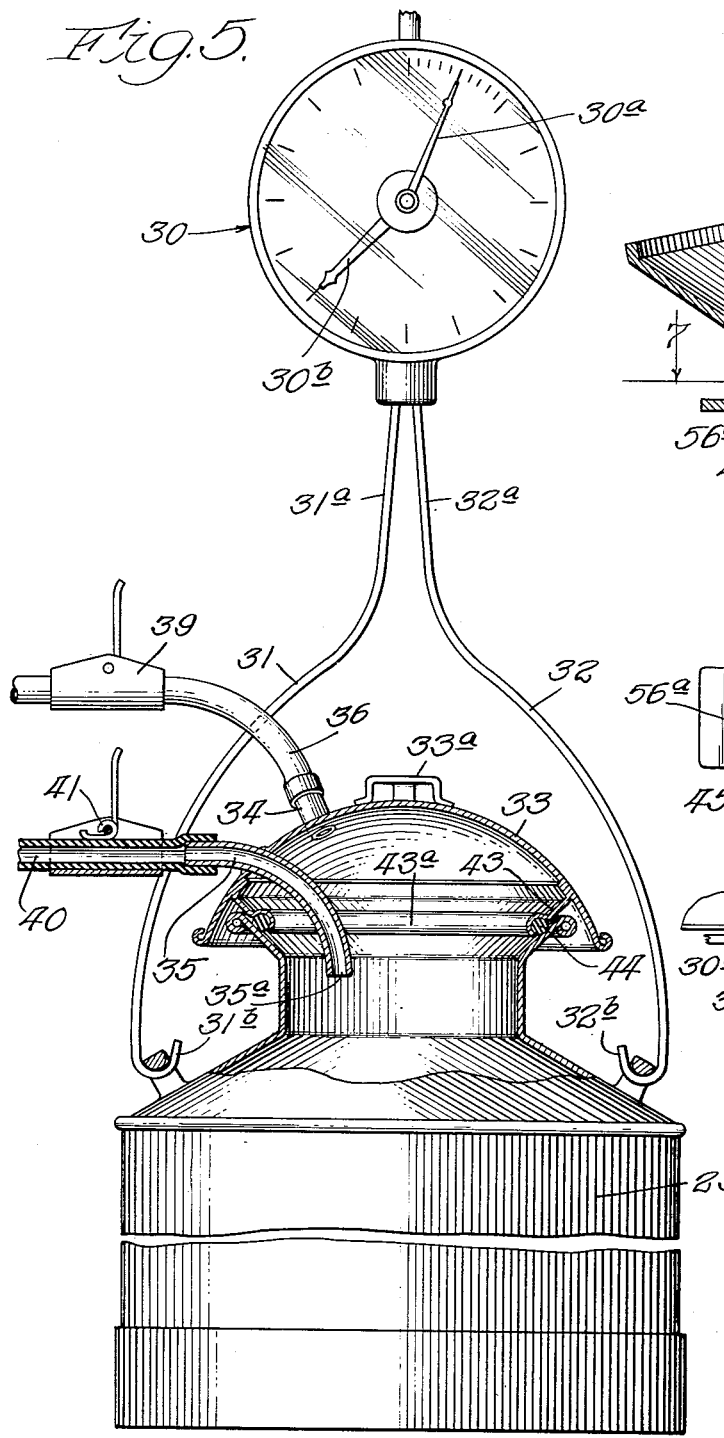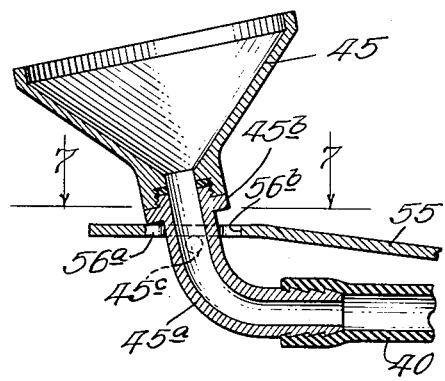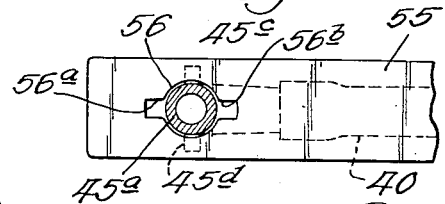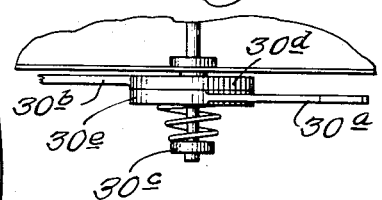

United States Patent Office 2,747,544
Patented May 29, 1956

2,747,544

TEAT CUP SUPPORT ASSEMBLY

Chester A. Thomas, Lake Forest, Ill., assignor to Babson Bros. Co., a corporation of Illinois Original application August 18, 1948, Serial No. 44,948. Divided and this application November 29, 1951, Serial No. 258,855

9 Claims. (Cl. 119—14.13)

This invention relates to a milking system and apparatus therefor, particularly for use in milking parlors.

This application is a division of my copending application Serial No. 44,948 filed August 18, 1948, abandoned in favor of continuation-in-part application Serial No. 237,922, filed July 21, 1951, now Patent No. 2,709,416.

One feature of this invention is the provision, in a system wherein milk is delivered directly from the teats to a final container, of means for applying a downward and forward tug and pull to the teats during milking; another feature of this invention is the provision of a support which provides the desired downward and forward force to the teat cups during milking, in such manner that there is automatic adjustment to udder irregularities, and yet supports the cups, if they fall off of the teats, in such manner that they automatically shut off and do not fall to the floor.

Other features and advantages of this invention will be apparent from the following specification and the drawings, in which:

Figure 1 is a fragmentary side elevational view of a part of a milking parlor, showing a single stall and associated apparatus; Figure 2 is a plan view of a portion of the parlor corresponding to Figure 1; Figure 3 is a transverse vertical sectional view along the line 3—3 of Figure 2; Figure 4 is a partial side elevational view of the can conveyer and shelves along the line 4—4 of Figure 2; Figure 5 is a fragmentary enlarged view, partly in section, of the milk can and associated supporting equipment; Figure 6 is an enlarged fragmentary vertical sectional view of the cup to which the teat cups deliver their milk; Figure 7 is a fragmentary sectional view along the line 7—7 of Figure 6; and Figure 8 is a fragmentary sectional view of the scale comprising part of the milk can support.

The present system is designed for and will be disclosed as embodied in a milking parlor employing the drop system, with the cow floor at a higher level than the operator's floor, as may be best seen in Figure 1. Milking parlors of this general type are more fully described, for example, in Babson et al. Patent Re. 22,368, and Babson et al. Patent 2,477,035. In such milking parlors the cows, after any desired preliminary washing of udder or other preparation, are admitted to a stall, as for example, the stall shown in Figure 1 as including the uprights 10 and 11 and transverse members 12, 13, and 14, the stall being shown in simplified form without the feed manger and chute and without gate operating equipment, for convenience and simplicity of illustration. Reference may be had to the above-named or other prior patents for a complete disclosure of a stall which would normally be used in practice.

The cow stands on a floor, identified as 15, which is at some suitable level, as two feet, above an operator's floor or alley identified in general as 16, a vertical wall 17 connecting the two floor levels. While I prefer to have a stepped arrangement of stalls and floor edges, as illustrated in the above mentioned patents, the stall is shown parallel to the wall 17 for simplicity of illustration. On the opposite side of the operator's alley 16 from the stall, as may be best seen in Figure 2, is a can conveyer here identified in general as 18 and including a plurality of rollers 18a supported at each end in frame members, as 18b. As may be best seen in Figures 3 and 4, the upper surfaces of the rollers 18a are in a plane which slopes toward the swinging doors 19 and 20 sufficiently to cause any can placed on the conveyer to roll toward and through said doors and be delivered into the milk room. As may be best seen in Figures 2 and 4, storage shelves are provided at a height above the conveyer exceeding the height of the can, as the shelves 21 and 22. These shelves are adapted to provide convenient storage for empty milk cans until such time as they are used in the milking operation, the shelves 21 and 22 being separated, opposite the stall, to provide a space through which can supporting means may move in delivering a can from milking position to the conveyer.

The milk can being used in milking, as the can here identified as 23, is here shown as supported in the air by overhead support means including weighing means. This support means is here shown as comprising a track member 24 extending transversely of the operator's alley 16, a runner or pulley arrangement 25 movable thereon, a readily operable lift arrangement, here shown as including a block and tackle arrangement comprising the blocks 26 and 27 and tackle or rope 28 provided with a hand pull 29, a scale indicated in general as 30, and a pair of hooking members 31 and 32 adapted to hook into the handles of the can. This provides means by which a can may be easily hooked onto on the operator's floor, raised to a desired height with its top about level with the cow floor, and moved between a milking position adjacent the wall 17 and a position over the conveyer 18, by a movement of the pulley arrangement along the track 24.

Referring now more particularly to Figure 5, a sealing arrangement is provided adapted to cover and seal the top of the can. This comprises a lid or dome member 33, which may have a handle 33a for convenience, and which is provided with openings into which are welded or otherwise fixed metal tubes 34 and 35. This latter tube comprises the milk delivery tube, and is so curved and of such a length as to extend substantially down into the top of the can, to prevent any possibility of milk being delivered from the end 35a thereof from being drawn into the tube 34 by vacuum in the hose 36. Adjacent and just below the edge of the cow floor 15 is a vacuum line or pipe 37 evacuated by any conventional source, as a vacuum pump and tank, and provided adjacent each stall with connector means here shown as a double cock 38. A hose from one side of this cock 38, the hose 36, connects to the tube 34 to evacuate the can, this hose being provided by a snap clip or shut-off 39. The hose 40 provided with the snap clip or shut-off 41 leads from the milk delivery tube 35 to the milk cup, as does also another vacuum hose from the double cock 38, this latter hose being here identified as 42. The hose 40 should be of large enough internal diameter to permit fast enough flow to substantially empty the cup before the next pulse of milk, but not so large as to permit the presence of too much air therein, a tube with an internal diameter of about a half inch having proved very satisfactory. The dome or lid 33 is provided with an annular inwardly and downwardly extending flange 43 curved at 43a to retain a sealing gasket 44, as a ring of rubber, which engages the sloping inner surface of the top of the can 23 and provides a vacuum-tight seal despite irregularities in a given can and irregularities in diameter or slope between the tops of otherwise generally corresponding cans.

Referring now more particularly to Figure 1, a funnel-like member 45, here generally termed the cup is provided with a removable lid 46 sealed thereto and having connector nipples extending therefrom uniformly therearound these being equally spaced and extending out at right angles from a wall section of the lid which is preferably at about 22½° to the axis of the cup. The cup 45 is preferably of transparent material, as Lucite or Plexiglas or other non-shattering and non-cold-flowing transparent plastic, to facilitate checking the progress of milking and the condition of the milk; and it provides a chamber of substantial area or capacity, at least a pint and preferably of the order of a quart or a little over, as a quart and a half, enabling each "pulse" of milk delivered from the inflations to separate from the ends thereof and not be drawn back around the teats as the inflation expands and contracts, providing a separation or "break" in the solid column of liquid which might otherwise exist in the conduit leading from the teat cups to the container. One of the nipples is here identified as 47, and it will be understood that it has its outer end so formed as to provide an automatic shut-off arrangement, for example of the type shown in my Patent No. 2,425,901. The nipples provide connection for and receive the ends of inflations of conventional shells, as for example the shell 48. Milking is of the double-acting type, alternate evacuation of air from and admission of air to the space between the shell and inner inflation being effected through the hose 42, through small branch hoses to the shell, as the hose 49, by action of the pulsator 50. The presence of the cup or chamber, and the action of the milk in covering the outlet from the cup at each "pulse," advantageously varies the vacuum applied to the teats during each cycle of operation.

Adjacent the vertical wall 17 and carried thereby is a supporting arrangement identified in general as 51, which supporting arrangement may in general be of the type shown in Babson et al. Patent No. Re. 22,368. A tube 51a has a rod 51b rotatable and axially movable therein, axial movement being effected by the adjustment handle 51c and associated mechanism. A helical spring 52, with one end attached to the arm 53 carried by the top of the rod member is adapted to urge the end of the same forwardly of the stall, with a strength adjustable by variation of the position of the end 52a of the spring on a toothed ratchet ring 54. The other or free end of the arm 53 is pivotally connected to the arm 55 which supports the cup or bowl 45 carrying the teat cups. The pivotal connection is such that the arm 55 may swing only in a horizontal plane, and this arm is preferably made of spring steel or similar springy material so that any up and down movement of the cup 45, after the initial height adjustment of the supporting arrangement, is by virtue of the springiness in this arm. The initial height adjustment is made, by means of the handle 51c, in such manner that when the teat cups are in place on the teats there is an upward bending of the arm 55, so that the springiness of this arm provides a definite downward force, assisting the weight of the teat cups and that of the cup or bowl 45, to provide a definite and considerable downward component of pull. As has been mentioned before, the forward component of the pull is provided by the helical spring 52, so that there is a downward and forward pull on the teats during milking which is intermittently varied to some extent by the pulsator action.

As may be best seen in Figures 6 and 7 a connection is provided between the arm 55 and the neck 45a of the cup or bowl such that ready removal and replacement can be effected and so that there is limited universal movement between the parts. The end of the arm 55 is provided with a generally circular opening 56 having slots 56a and 56b on two opposite sides thereof. The neck 45 of the bowl is provided with an upper annular collar 45b of considerably larger diameter than the circular opening 56, and is provided beneath the arm 55 with a pair of oppositely extending studs or trunnions 45c and 45d. In putting the cup 45 on the end of the arm 55 the neck 45a (with the hose 40 removed) is slipped down through the opening 56 until the studs 45c and 45d pass through the slots 56a and 56b, and thereupon it is turned 90° to the position shown in Figure 6, connection of the hose 40 keeping it in this position during milking. As may be seen in Figure 6, limited angular movement (as for example about 20°) is permitted in each direction from a perpendicular relationship of the axis of the cup with respect to the plane of the arm 55. During milking engagement of the studs 45c and 45d with the underside of the arm 55 provides the desired downward pull. Yet if the teat cups lose their hold because the vacuum is broken for any reason and drop off, the arm 55 keeps the arrangement from dropping to the floor and keeps the cup 45 generally upright, so that the teat cups drop down to each side of the cup 45 and shut off automatically.

In milking with this system and apparatus the operator would remove an empty can from the shelf, as 21, and hook the elements 31 and 32 into the handles of the empty can. In the arrangement shown these elements are of spring wire and normally are more widely spaced than the handles of the milk can, and gripping of the parts 31a and 32a and squeezing these together brings the hook parts 31b and 32b into engagement with the handles, where they remain so long as the can is suspended off the floor, the operator effecting this lift by the block and tackle arrangement. The cover or dome 33 would then be put in place on the can and the various cocks or shutoff valves opened. The raising and lowering device would then be adjusted to a height suitable for the cow in the stall, and the teat cups lifted and put on the teats. Milking would then proceed, with all milk entering the cup 45 discharging immediately through the hose 40 into the can. As soon as the cow is milked out the teat cups would be removed, their automatic shut-off action holding the vacuum, and the amount of milk given by the cow read from the scale 30 and noted on the record sheet.

As soon as the next cow was in the stall the cup would be swung into position under her udder and the supporting arrangement adjusted to the proper height, whereupon this cow would then be milked into the same can 23. Before milking of this next cow is started the hand 30a of the scale should be returned to zero position, by rotation of the knob 30c shown in Figure 8. The scale directly operates the totaling hand 30b, there being a spring pressed frictional drive of the hand 30a, by engagement of the discs 30d and 30e, which normally keeps the hands together but enables the hand 30a to be returned to zero position for each succeeding cow. This last mentioned hand therefore provides the weight of milk for each cow, whereas the hand 30b shows the total weight in the milk can at all times.

When the scale shows the can to be nearly full the shut-off valve 39, and also the milk shut-off 41 if necessary, would be closed and the cover 33 removed from the can. The carrier 25 would then be run along the track 24 until the can was over the conveyer 18, whereupon it would be lowered onto the container and the supports unhooked from its handles. The can would then move on down the conveyer and into the milk room, while a new can would be removed from the shelf and the operation repeated.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In connection with a milking parlor stall, supporting apparatus for a teat cup assembly, including: a first arm projecting into said stall and pivotally mounted at its outer end; and a second arm pivotally mounted on the inner end of the first arm and projecting backwardly therefrom, both pivotal mountings providing movability of the arms substantially only in a horizontal plane and at least the second arm being of spring material for applying a downward pull to the teats during milking.

2. In connection with a milking parlor stall, supporting apparatus for a teat cup assembly, including: a first arm projecting into said stall and having its inner end movable generally longitudinally thereof; and a second arm movably mounted on the inner end of the first arm, at least the second arm being of spring material; and means operably associated with said apparatus for adjusting the vertical position of at least the second arm to apply a desired pull to the teat cup assembly during milking.

3. In connection with a milking parlor stall, supporting apparatus for a teat cup assembly, including: a first arm projecting into said stall from a side thereof and mounted at its outer end for pivotal and vertical movement; adjustable spring means urging the inner end of said first arm forwardly of the stall; and a second arm pivotally mounted on the inner end of the first arm and projecting backwardly therefrom, both pivotal mountings providing movability of the arms substantially only in a horizontal plane and at least the second arm being of spring material.

4. In connection with a milking parlor stall, supporting apparatus for a teat cup assembly, including: a first arm projecting into said stall from a side thereof and mounted at its outer end for pivotal and vertical movement; adjustable spring means urging the inner end of said first arm forwardly of the stall; and a second arm pivotally mounted on the inner end of the first arm and projecting backwardly therefrom, both pivotal mountings providing movability of the arms substantially only in a horizontal plane and at least the second arm being of spring material and the connection between the second arm and the teat cup assembly providing universal relative movability, but only to a predetermined limited extent.

5. Supporting apparatus for means applied to an animal's teats for withdrawing milk therefrom for delivery through a conduit to some desired spaced point, including: resilient supporting means having a portion engaging an upwardly presented surface of said milk withdrawing means applying a downward pull to the teats during milking, said resilient means having limited movement and said portion being adapted to engage a downwardly presented surface of said milk withdrawing means for preventing the milk withdrawing means from falling to the floor.

6. Supporting apparatus for means applied to an animal's teats for withdrawing milk therefrom for delivery through a conduit to some desired spaced point, including: a vertically and horizontally adjustable supporting member having a resilient portion for resiliently supporting said milk withdrawing means and including an end portion detachably securable to said milk withdrawing means and engaging an upwardly presented surface thereof applying a downward pull to the teats during milking, said member having limited vertical movement and the end portion being adapted to engage a downwardly presented surface of said milk withdrawing means for preventing the milk withdrawing means from falling to the floor on separation from the teats; and adjustable resilient means for applying a predetermined forward pull to the teats during milking.

7. Milking apparatus of the character described, comprising: milk withdrawing means to be applied to an animal's teats for withdrawing milk therefrom and forming a part of a carry-away milking system; and supporting means having limited movement for supporting said milk withdrawing means, both said means having cooperating interengaged portions, said supporting means engaging an upwardly presented surface of said milk withdrawing means during milking applying a downward pull to the teats and engaging a downwardly presented surface of said milk withdrawing means when said means becomes separated from the animal's teats, preventing said milk withdrawing means from falling to the floor.

8. Milking apparatus of the character described, comprising: milk withdrawing means to be applied to an animal's teats for withdrawing milk therefrom and forming part of a carry-away milking system; a vertically and horizontally adjustable supporting member having limited vertical movement and including a resilient portion for resiliently supporting said milk withdrawing apparatus, both said milk withdrawing means and said supporting member having cooperating interengaged portions, said supporting member engaging an upwardly presented surface of said milk withdrawing means during milking applying a desired adjustable downward pull to the teats and engaging a downwardly presented surface of said milk withdrawing means when said means become separated from said animal's teats, preventing said milk withdrawing means from falling to the floor.

9. Milking apparatus of the character described, comprising: milk withdrawing means including a teat cup assembly adapted to be applied to an animal's teats for withdrawing milk therefrom and forming a part of a carry-away milking system, said means being lighter than necessary to provide the desired downward pull on the teats during milking; resilient supporting means for said milk withdrawing apparatus and having limited vertical movement, both said means having cooperating interengaged portions, the end portion of said supporting means engaging an upwardly presented surface of said milk withdrawing means during milking applying the desired downward pull to the teats, and said end portion engaging a downwardly presented surface of said milk withdrawing means when said teat cup assembly becomes separated from the animal's teats, preventing said milk withdrawing means from falling to the floor; and adjustable resilient means biasing said supporting means in a forward direction applying a forward pull to the teats during milking.

References Cited in the file of this patent

UNITED STATES PATENTS

| | | |
|---|---|---|
| 1,859,214 | McCornack | May 17, 1932 |
| 2,136,228 | Babson et al. | Nov. 8, 1938 |
| 2,483,516 | Babson | Oct. 4, 1949 |
| 2,543,162 | Floerke | Feb. 27, 1951 |